(No Model.)

B. S. RAYBUCK.
NUT LOCK.

No. 467,324.  Patented Jan. 19, 1892.

Witnesses:
B. S. Ober
W. S. Duvall

Inventor
Balthaser S. Raybuck,
By his Attorneys,
C. A. Snow & Co.

THE NORRIS PETERS CO., PHOTO-LITHO., WASHINGTON, D. C.

UNITED STATES PATENT OFFICE.

BALTHASER S. RAYBUCK, OF FREED, WEST VIRGINIA.

NUT-LOCK.

SPECIFICATION forming part of Letters Patent No. 467,324, dated January 19, 1892.

Application filed October 8, 1891. Serial No. 408,165. (No model.)

*To all whom it may concern:*

Be it known that I, BALTHASER S. RAYBUCK, a citizen of the United States, residing at Freed, in the county of Calhoun and State of West Virginia, have invented a new and useful Nut and Bolt Lock, of which the following is a specification.

This invention relates to a combined nut and bolt lock, the objects in view being to provide a cheap and simple arrangement for rigidly locking the nut upon the bolt against rotation and the bolt itself against rotation, whereby the same is especially adapted for use in positions where a constant jar takes place, as in removing parts of machinery, railroad-joints, &c.

A further object of the invention is to provide means for disengaging the nut from the bolt when occasion may require without danger of permanently impairing the efficiency of the same in subsequent use.

With these objects in view the invention consists in certain novel features of construction hereinafter specified, and particularly pointed out in the claims.

Figure 1:
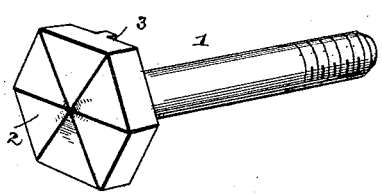
Figure 2:
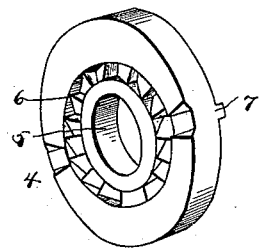
Figure 3:
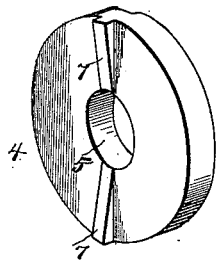
Figure 4:
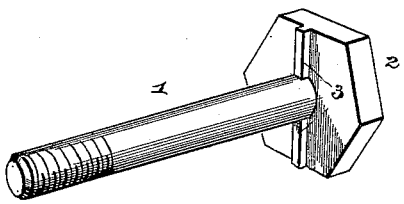
Figure 5:
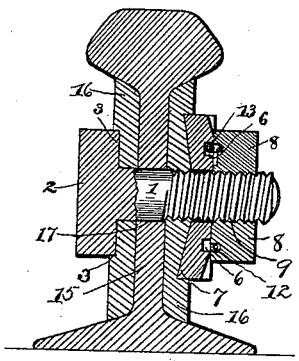
Figure 6:
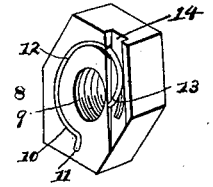

Referring to the drawings, Figure 1 is a detail in perspective of the bolt. Fig. 2 is a similar view of the washer. Fig. 3 is a reversed perspective of the washer. Fig. 4 is a reverse perspective of the bolt. Fig. 5 is a vertical longitudinal section taken through a rail-joint in which the bolt and nut are locked in accordance with my invention. Fig. 6 is a detail of the nut.

Like numerals of reference indicate like parts in all the figures of the drawings.

1 indicates the bolt, having the usual cylindrical threaded body and terminating at its rear end in the head 2, which may be either rectangular, polygonal, round, or other shape. The inner face of the head is provided at diametrically-opposite sides of the bolt-body with superficial radial ribs 3, which when the bolt is placed in position within an object are driven into said object, if the latter be of wood, by a few taps of a hammer applied to the head; or, if the object be of metal, recesses may be formed at opposite sides of the bolt-hole, and in any event after the nut has been applied so as to retain the bolt-head in contact with the object, it will be obvious that said bolt is prevented from any rotation whatever. The washer 4 is simply a metal disk having a concentric bolt-receiving opening 5 and upon its outer face a series of countersunk teeth 6, arranged in annular concentric form around the bolt-opening. The rear or inner face of the washer, like the head, is provided at radially-opposite sides of the bolt-opening with superficial ribs 7, applied to the object through which the bolt passes either by the pressure of the nut or by engaging previously-formed recesses, as may be necessary. The nut 8 (in this instance hexagonal) may be of any desired shape, is provided with the usual threaded bolt-receiving opening 9, and upon its inner face is provided with a countersunk annular narrow recess 10, which at one end is provided with a radial branch 11. In this recess is seated a partial coil or convolution of a spring 12, which after being placed within the recess is maintained therein by the upsetting or spreading of the metal of the nut at the opposite edges of the recess, such spreading being accomplished by a few taps of a hammer upon the inner face of the nut. The upsetting does not take place the entire length of the recess, but only about midway, leaving one end securely embedded within the recess, while the remaining end of the spring is slightly deflected, forming an engaging pawl 13. Opposite this engaging pawl the inner face of the nut is provided with a shallow transverse recess 14 for a purpose hereinafter described.

15 designates the web of a rail, 16 the fish-bars, and 17 the bolt-opening.

In operation the bolt is applied in the ordinary manner, the ribs of the head thereof resting in recesses formed at opposite sides of the bolt-opening, after which the washer is introduced over the opposite end of the bolt and likewise locked to the fish-bars. Subsequently the nut is run down upon the bolt, and as it tightens against the washer its spring-pawl rides over the inclined countersunk teeth of the washer, and as tightened against the washer the nut is prevented from retrograding by the engagement of the spring-pawl with one of the inclined teeth. It will now be obvious that a secure lock has been formed between the nut and washer, the washer and bolt, and the bolt and washer with the fish-bars, so that neither one of them is capable of any independent motion, and they, all combined, are locked against a universal movement. If it be desired to remove the nut at any time from the bolt, such is readily accomplished by the introduction through the transverse recess formed upon the inner face of the nut of the end of a nail or other suitable key, which may be employed to elevate or withdraw the end of the pawl from engagement with the teeth, whereupon the nut may be removed and the parts otherwise separated. It will be seen that by the construction described the expansion and contraction of the parts composing the lock and bolt will be permissible, and yet the turning of the bolt cannot take place.

Having described my invention, what I claim is—

1. The combination, with the threaded bolt, of the perforated disk, the front face of which is provided with a series of countersunk teeth and the rear face of which is provided with diametrically-opposite superficial ribs adapted to engage with recesses formed at opposite sides of the bolt-hole of an object, the nut mounted on the bolt and provided upon its inner face with a concentric recess, and a spring-pawl located in the recess and having the metal of the bolt upset over the same for a portion of its length and its opposite end deflected to form an engaging end, substantially as specified.

2. The combination, with the bolt having the head formed at one end and provided at diametrically-opposite sides of the bolt and upon its inner face with superficial radial ribs, of the circular washer, the rear side of which is provided with diametrically-opposite radial locking-ribs and the outer face of which is provided with a concentric series of countersunk teeth, the nut mounted on the bolt and having its inner face provided with a narrow annular recess having a radial branch 11, the spring-wire 12, fitting the groove, the edges of the latter being upset to inclose a portion of the wire, which wire has its free end deflected to form an engaging pawl, and the transverse recess formed in the inner face of the nut and in the path of the pawl, whereby a pawl-disengaging key may be inserted, substantially as specified.

In testimony that I claim the foregoing as my own I have hereto affixed my signature in the presence of two witnesses.

BALTHASER S. RAYBUCK.

Witnesses:
E. E. MEANS,
E. B. TELUHARTY.